(12) United States Patent
Dangeville et al.

(10) Patent No.: US 11,188,307 B2
(45) Date of Patent: *Nov. 30, 2021

(54) MODELIZING RESOURCES AND EXTERNAL DATA OF A PROGRAM FOR PROCEDURAL LANGUAGE CODING

(75) Inventors: Nicolas Dangeville, Paris (FR); Johan Ponin, Coubron (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1787 days.

This patent is subject to a terminal disclaimer.

(21) Appl. No.: 13/316,624

(22) Filed: Dec. 12, 2011

(65) Prior Publication Data
US 2012/0150526 A1    Jun. 14, 2012

Related U.S. Application Data

(63) Continuation of application No. 12/247,339, filed on Oct. 8, 2008, now Pat. No. 8,140,320.

(30) Foreign Application Priority Data

Oct. 3, 2008   (EP) ..................................... 08305639

(51) Int. Cl.
*G06F 8/10*          (2018.01)
(52) U.S. Cl.
CPC ..................... *G06F 8/10* (2013.01)
(58) Field of Classification Search
CPC ....................................................... G06F 8/10

USPC ......................................................... 703/21
See application file for complete search history.

(56) References Cited

U.S. PATENT DOCUMENTS

| 7,275,096 | B2 | 9/2007 | Green |
| 7,543,268 | B2 | 6/2009 | Cherdron et al. |
| 7,840,935 | B2 | 11/2010 | Fildebrandt et al. |
| 7,979,840 | B2 | 7/2011 | Zhang et al. |
| 2008/0163159 | A1 | 7/2008 | Oara et al. |

OTHER PUBLICATIONS

Muller, Database Design for Smarties: Using UML for Data Modeling, Morgan Kaufmann Publishers, 1999, 442 pages.*
IBM, "Rataional Developer for System z", IBM, 2005, 21 pages.*
IBM Rational Developer for System z, Version 7.1, Sep. 14, 2007, ftp://ftp.software.ibm.com/software/rational/web/datasheets/rdz.pdf, 12 pages.*

(Continued)

*Primary Examiner* — Brian S Cook
(74) *Attorney, Agent, or Firm* — Cuenot, Forsythe & Kim, LLC

(57) ABSTRACT

A computer-implemented method of representing a software application to be coded in a procedural language is provided. An initial UML class diagram modelizing the software application is received. Data definition classes within the initial UML class diagram are identified. Class operations within the initial UML class diagram are identified. The initial UML class diagram is modified by a processor to generate an extended UML class diagram by applying a data object stereotype to the identified data definition classes, and applying a program stereotype to the identified class operations. The data definition classes represent logical data, and the class operations represents programs.

9 Claims, 7 Drawing Sheets

(56) References Cited

OTHER PUBLICATIONS

IBM Rational Developer for System z, Version 7.1, Sep. 14, 2007, ftp://ftp.software.ibm.com/software/rational/web/datasheets/rdz.pdf, Cover + metadata, 1 page.*

"Describing the Program Resources and Linkage Data," IBM, <http://publib.boulder.ibm.com/infocenter/ratdevz/v8r0/index.jsp?topic=/com.ibm.etools.umix.cobol.doc/tasks/zapg020.html>, retrieved Jul. 19, 2011, 4 pgs.

* cited by examiner

MODELIZING RESOURCES AND EXTERNAL DATA OF A PROGRAM FOR PROCEDURAL LANGUAGE CODING

CROSS-REFERENCE TO RELATED APPLICATIONS

This application is a Continuation of U.S. application Ser. No. 12/247,339, filed on Oct. 8, 2008.

FIELD OF THE INVENTION

The present invention generally relates to software development; more particularly, the invention aims at representing in a design model of a program that will be coded in a procedural language such as COBOL, resources and external data using the UML graphical modelization.

BACKGROUND OF THE INVENTION

To develop software applications in a procedural language code such as COBOL, it appears relevant to create design models including a representation for data manipulated by the programs of the application. There are three categories of data that a program manipulates: (1) the resources of a program that can be files, tables, message queues etc. . . . , (2) they're are data that the program manipulates and which come from external sources. The external data are manipulated by a program, they are the parameters that the program can accept or exchange and which are passed in memory by one other program which is called. The representation of an external data will provide, for instance, the definition of a linkage section in COBOL language. (3) the local data; local data definition strongly reflects the detailed implementation of the program.

Traditional methodologies, such as Merise [1], that are dedicated to procedural programming, describe the definition of the data, both at the logical and physical layer. It also describes nested models for the logical processing. With Merise, the resources and external data are satisfactorily modelized with the physical layer. The behavior of the processing includes the use of the data by the concept of a task. A task can be mapped to an abstraction of a program.

Software applications can also be modelized using a standardized specification language such as Unified Modeling Language (UML), a visual specification language. The models, such as the class diagrams, created with UML are then used to derive the actual programming code. UML is often used for Object Oriented development but is more commonly adopted by the industry for high level software design in general. These design elements are further transformed into UML logical artifacts that will target artifacts of a programming language, commonly, Object Oriented language. The benefits of using UML during the design phases and describing UML logical artifacts include the ability to conduct design review with a commonly accepted, high design language. It allows capturing the critical information that describes the application without detailing it down to the implementation level, and applying Model Driven Architecture techniques that provide code generation.

Procedural languages are still widely used in the mainframe world. One example is COBOL. It is different from object oriented language knowing that UML modelization particularly fits object oriented languages. As a matter of fact, an object oriented language is constituted by a set of classes which can be directly modelized by UML. On the contrary, a procedural language includes operations on resources and data which cannot be directly represented as a class diagram. The traditional representation of a procedural language is a flow chart.

Being able to extend UML logical artifacts for a procedural language such as COBOL would unify asset representation in an enterprise. There is no direct, obvious use of UML graphical modelization today to represent the logical artifacts of a COBOL program.

Use of profiles in UML 2.0 allows, for instance, defining a database schema using class diagrams. However, the use of the tables in the database by a procedural program cannot be directly and obviously represented by UML 2.0.

Existing literature describes some techniques using UML diagrams to visually exhibit resources and data manipulated by existing COBOL programs. This visualization can be used as design documentation of the COBOL program. However, this design documentation is close to the COBOL code, it cannot be used by UML to specify a data structure independently from its physical implementation. These techniques do not provide a method to define the resources and data manipulated by a program in a way that is consistent with the UML design models which capture logical definitions of both program and data.

One illustration of the technique of visually exhibiting existing COBOL program code is provided in the Web page at the following address:

ibm.com/developerworks/rational/library/content/RationalEdge/sep02/AutomatedSep02.pdf [2]

This article focuses on how to best represent in UML the elements of the COBOL language. The representation of the COBOL language elements allows documenting, enhancing or refactoring the COBOL code. The documentation design is close to the code and does not provide design level which is independent from the language. FIG. 4 on page 11 defines the "participating tables" of a program. UML 2.0 allows definition of stereotypes which are a new type of model element, to characterize a specialized usage and attach specific properties. A stereotype can be defined for various UML elements such as class, operation, attribute, relationship etc. . . . In this prior art a program is represented as a UML 2.0 stereotyped class and the participating tables as stereotyped classes, relationships being established between the program class and the table classes. Such a method works well in a reverse engineering scenario where you want to capture all the details of existing code and expose them in UML.

To create a UML design of a COBOL program we proceed from architectural design to COBOL specific design (what is commonly called top-down approach: from design to code). Not all the details of COBOL language are relevant to be captured at this stage of the development. It is critical in a top down scenario to have representations that are consistent with the logical definitions that have been captured at the design stages and to extend these representations rather than use new ones that follow a different logic.

There is thus a need to capture at a high level of abstraction the definition of a program and the resources it manipulates, their types and their logical definition, that integrates nicely with the UML representations used during design phases. Capturing the meaningful set of information regarding the program definition enables architecture reviews and code generation in a way that is consistent with the existing high level diagrams.

ego.developpez.com/uml/tutoriel/cobol/uml-cobol_v1.0.pdf [3]

proposes a method to use UML and specifically targets COBOL. This method explains how to represent data in UML that is COBOL oriented and how to define programs. Programs are described from the Operations of a Class, which are close in concept. Representing the program through the means of an operation of a class is key in the goal of extending a general architectural scheme to add COBOL specific extensions. Since relationships can only be drawn from a class to another class in a UML class diagram, it is not possible with this representation to use relationships in order to describe the "participating tables" of a program as done with prior art [2]. The signature of the program and its parameters are the concepts that define the data manipulated by an operation in UML. In this prior art, the parameter data points to class definitions that are used to define the external data of the program. The external data will provide the definition of the linkage section of a COBOL program. The linkage section is a dedicated construct to describing the parameters that a program can accept or exchange when called from another program.

This method is a good starting point to describe COBOL programs in a way that is consistent with the high level UML design techniques. However, it does not allow the capturing of some important information about a program: it does not provide a method to capture all the resources that a program manipulates, such as files or relational tables.

This is a limitation of the method since a significant amount of classes defined in an architectural class diagram are designed to describe data definition and will be used as persisted data, such as files, tables of a database (hierarchical or relational) message queues, etc. Capturing only the data that programs share with other programs is not enough. Thus this method lacks completeness to fully describe the data that the program manipulates, when such information is likely to be already captured in the class diagram.

Applying the techniques of prior art [2] to prior art [3] would lead to apply a dedicated stereotype to select Data Definition classes. Doing this is not satisfactory for several reasons:

the logical definition of business data needs to be preserved and separated from its physical description. Stereotyping the logical definition of data definition classes as a physical Resource mixes the two layers.

It is very common for a program to receive from another program a data structure of a given type and to manipulate a Resource based on the same type (for example, receive the current customer data and have access to the customer table). There is duplication when the same logical definition needs to be expressed as several physical representations.

There is thus a need for a designer tool that would extend the common UML representations and describe in a consistent way with prior high level UML design the data that a program manipulates, whether it is a resource coming from external sources or is an external data passed in-memory from another program. This representation should preserve the definition of logical data that comes from the first step of UML modelization.

SUMMARY OF THE INVENTION

It is an object of the invention to represent consistently with the high level UML design of logical data, the resources manipulated by a program to be coded into a procedural language and external data which is received from a program. As a result, this modelization will allow for systematic code generation of code in procedural language as it is possible today with UML for object oriented programs.

The object is reached with the method of claim 1 to represent in UML the resources and external data manipulated by programs of a software application to be coded in a procedural language, said method comprising:

a developer creating an initial UML class diagram modelizing the software application and extending the initial class diagram by:

applying a new "Data Object" stereotype to the data definition classes in the initial UML class diagram which represent logical data;

applying a new "Program" stereotype to the corresponding class operations which represent programs in the initial UML class diagram;

for each parameter of each "Program" stereotyped class operation that represents a Resource manipulated by the program in the initial UML class diagram, creating a new UML class;

applying a new "Resource" stereotype to this new class;

linking the new class to the Data Object class that is used as a type for the given parameter in the initial UML;

applying a "resourceIsStructured" stereotype to the link;

changing the parameter type to use the newly created Resource class instead of the Data Object class;

the other parameters of each "Program" stereotyped class operation that do not represent a Resource manipulated by the program in the initial UML class diagram, represent external data in the extended class diagram.

The object is also reached, according to claim 2, with the method of claim 1 wherein the step of applying a new "Resource" stereotype to this new class includes applying "File", "Table", "Queue" (349) new stereotypes representing the physical types of resources on already stereotyped resource classes.

The object is also reached, according to claim 3, with the method of claim 1 or claim 2 wherein the step of applying a new "Resource" stereotype to this new class includes defining properties for each new "Resource" stereotype, said properties comprising at least the "Resource name" property.

The object is also reached, according to claim 4, with the method of any one of claims 1 to 3 further comprising:

the developer creating a transformation tool to generate code in a procedural programming language from the extended UML class diagram.

The object is also reached, according to claim 5, with the method of any one of claims 1 to 4 wherein the steps for extending the initial UML class diagram are performed using UML 2.0 or following versions.

The object is also reached, according to claim 6, with method of any one of claims 1 to 5 wherein the steps following the step of applying a new "Data Object" stereotype, are automatically performed executing IBM Rational Software Architect version 6 or 7, the developer creating a pattern describing the typical use case of a Class operation that represents a program with its parameters representing resources;

applying, after the step of applying a new "Data Object", for each class operation corresponding to a program in the initial UML class diagram, the created pattern to the initial UML class diagram extended with the "Data Object" stereotypes, using two inputs which are the class operation of the initial class diagram and the data objects if there is at least one used as external data for the program.

The object is also reached, according to claim 7, with a computer program product comprising programming code instructions for executing the steps of the method according to any one of claims 1 to 6 when said program is executed on a computer.

The object is also reached, according to claim 8, with a system comprising means adapted for carrying out the method according to any one of claims 1 to 6.

The core ideas of this invention are:
Work with a UML class diagram and extend it through the use of stereotypes that identify a procedural language such as a COBOL program and Data Objects. Data Objects identify the classes that provide data definitions.
Use the parameters of the operation to capture the data manipulated by the program, whether it is a resource (such as a file, a table a message queue) or an external data (in-memory data received from one other called program)
Provide a Stereotype for representing a Resource and Stereotypes for identifying the physical resource types. The main resource types involve Sequential file, VSAM file, database table, message queue.
Don't stereotype the DataObject with the Resource stereotype, but instead, introduce a new class, stereotype it as a Resource and link it to the DataObject through a stereotyped relationship
Change the parameter type of the parameters of the operation and use the Resource class instead of the DataObject class wherever a parameter represents a Resource.
Treat parameters of a primitive types or of a DataObject type as linkage data of the program.

With the method of the invention, we have a simple, non ambiguous UML representation that is able to capture a COBOL program definition, the resources that it used, its external data and the data definition of the resources and of the linkage storage section. This description is based on a common vocabulary and is consistent with the representation used during the previous steps of the design. It makes review easy to perform since the semantics of the artifacts is well understood. It can be used by a dedicated transformation tool in order to generate the appropriate code to define the program, its resources, linkage data and the related data definitions. Note that this method does not aim at representing local data allocated during program execution, as it strongly relates to the detailed implementation of the program.

Furthermore, with the method of the invention we have the following benefits:
a solution that is applicable to any program that is described through the operation of a UML class. Using an operation is a typical case for Service Oriented Architecture (SOA) and the mapping to a program is a natural extension for procedural languages. The logic of the resource operations remains the same, whatever the target.
Some steps of the method can be advantageously automated: for instance, via the use of patterns which is possible with IBM Rational Software Architect (RSA) version 6 or 7 to automate the creation of Resources and their declaration in the signature of the operation that represents a program.
This method can be used to create UML design model for a program to be coded into other procedural languages such as C and PLI.

DETAILED DESCRIPTION OF THE PREFERRED EMBODIMENT

Figure 1:
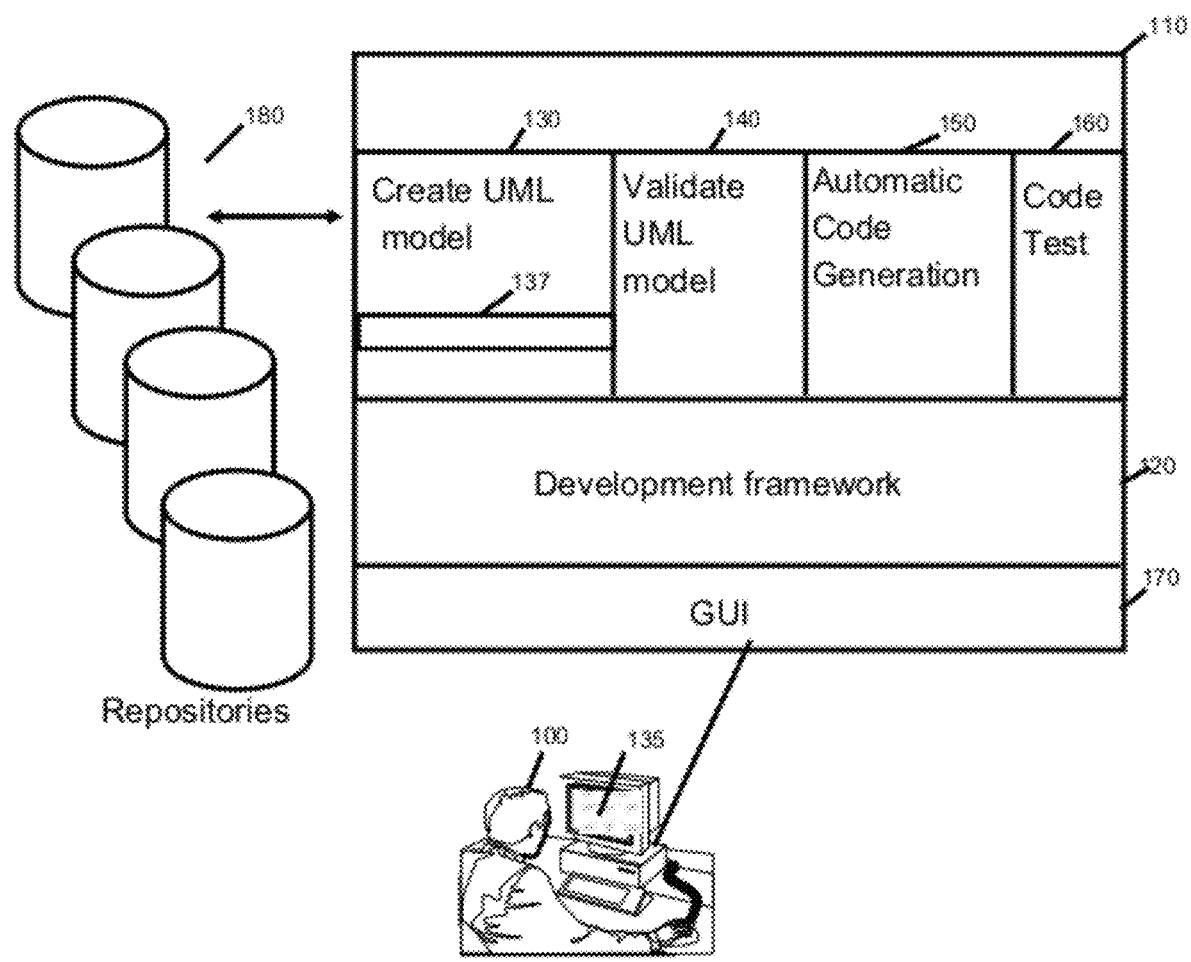
FIG. 1 describes the system environment of the method of the preferred embodiment.

FIG. 1 is the system environment of the method of the preferred embodiment. The developer (100) who wants to create procedural programming code, uses a development framework (120) on his computer and a UML design tool (130) for designing programs with graphical user interface (137), for validating the model (140), for creating code (150), automatically in the preferred embodiment, and testing it (160) using a code test environment. Repositories (180) storing models, code elements, scripts etc. . . . are accessed by these design tools. A UML class diagram (135) representing the classes and their relationships is displayed on the console of the developer. These classes will be used by the components of the application. With the method of the preferred embodiment, the developer can extend the class diagram and identify the operation of a class, which is supposed to represent a program. The parameters of the operation will capture the data manipulated by the program. The developer will introduce new classes, link them to the classes pointed by a parameter of the operation that represents a program, stereotype the class as a Resource, stereotype the relationship between the two classes and modify the type of the parameter to point to the newly created resource type. The developer will then apply a second stereotype to the resource type to indicate the physical type of the resource. By processing each parameter of the operation, the developer will describe which data the program manipulates, whether it is physical resource or external data. As with the other UML models it will be possible to automatically generate the definition of a program and the definition of the data and resources manipulated by the program for a given environment using dedicated automatic code generators.

A new software layer (137) is added to the function allowing the extension of an existing UML diagram to describe a program, its linkage data and its resources.

It is noted that it is possible to facilitate creation of resource class extensions using design tools (130): for instance, the IBM Rational Software Architect (RSA) Version 6 and 7 patterns can automate the creation of the model by creating the resource classes, link them to the appropriate classes, changing the parameters type and applying the appropriate stereotypes.

Figure 2:
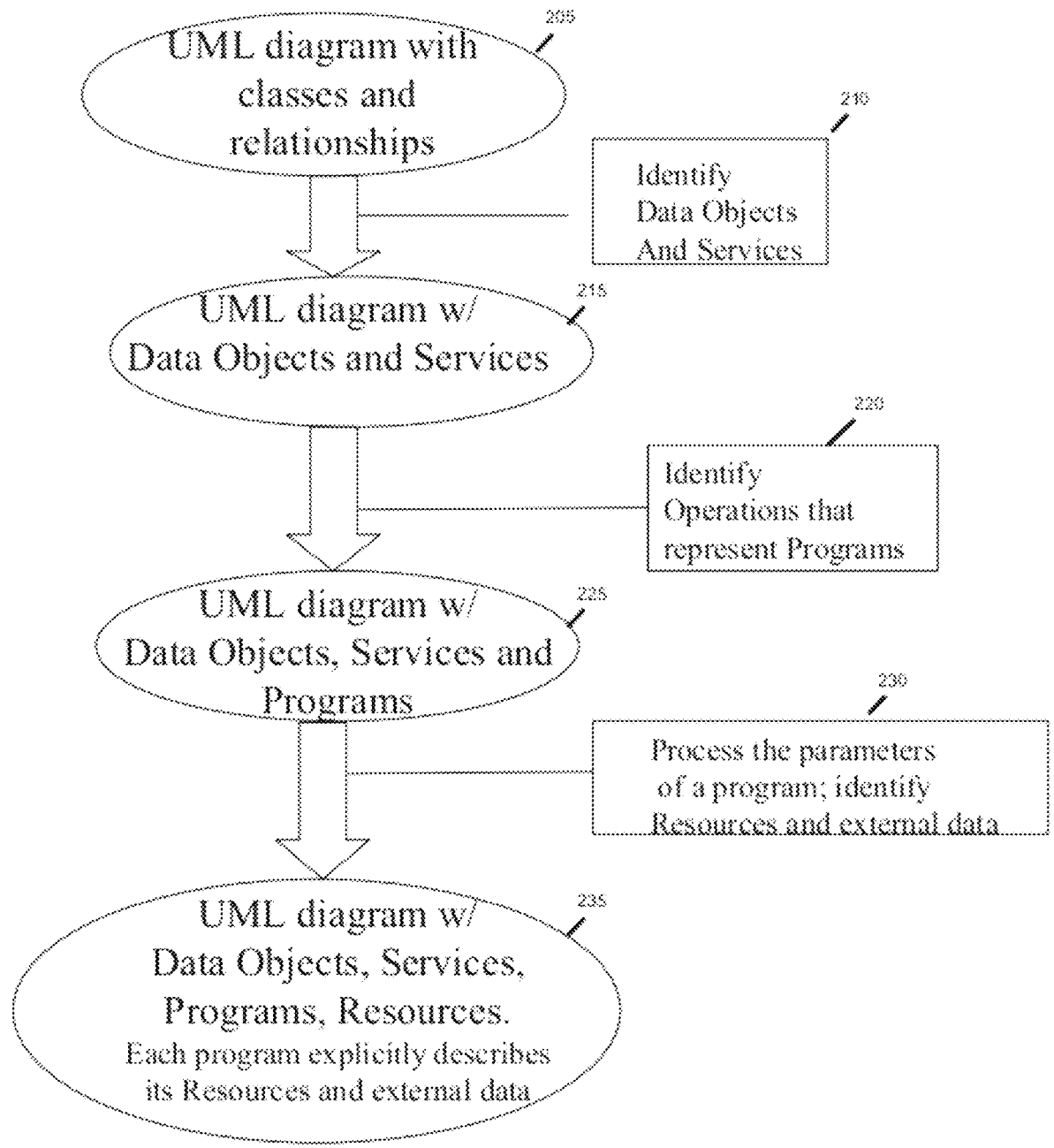
FIG. 2 illustrates the general steps of the method and data flow generated by the steps of the method according to the preferred embodiment.

FIG. 2 illustrates the general steps of the method and data flow generated by the steps of the method according to the preferred embodiment. The input data flow (205) is a UML class diagram which contains all the classes with attributes and operations and also relationships between these classes necessary to develop an application. This UML class diagram is obtained by the architects of the application after executing their design work through the existing graphical tools of the prior art for creating object models.

With UML 2.0, it is possible to define stereotypes and use them in a class diagram. This allows creating new model elements, derived from existing ones, but which have specific semantics and properties that are suitable for the problem domain, here the elements in relation with program, data and resources. One new stereotype is the "DataObject" class defining the structure of a piece of data in the system. One other new stereotype is the so called "ServiceSpecification" class, such a stereotyped class is for describing classes that provide operations that act upon the DataObjects. These classes will contain operations to translate into programs.

As described in prior art [2], suggesting to have an operation of a UML class defining a COBOL program, another new stereotype is the "Program" stereotype that will be applied to an operation of a ServiceSpecification class that represents a COBOL program.

As described in prior art [2], suggesting to have an operation of a UML class defining a COBOL program and its parameters as linkage data, it is desirable to use the parameters of an operation, stereotyped as a program, in order to define the data that the program is going to manipulate. However, identifying data for a program is not enough. We need to identify, amongst these classes, the data that is coming from resources and the data passed in memory by another program (external data).

We now introduce a new stereotype "Resource" that can apply to classes of a class diagram in order to identify amongst the classes of the class diagram, that a class defines a Resource. Such a Resource class will later be linked to the logical data definition that is represented by a Data Object class. The physical representation of a resource could typically be a file (sequential, indexed, etc.), a database table, a message queue, etc. Dedicated additional stereotype applied to the same class allow specialization of the resource, indicate its physical type (File, database table, queue) and its specific characteristic (nature of the file, type of database used (hierarchical, relational), etc.

The Resource stereotype is a generic stereotype to indicate that a class defines a Resource. Related to this stereotype, we also introduce File, Table, Queue stereotypes that will define the physical representation of the resource and its properties.

The obvious way to distinguish Resources from linkage data amongst Data Object would be to apply the Resource stereotype to select Data Objects. This is similar to the way that prior art [1] proceeds. Doing this is not satisfactory for several reasons:

the Data Object ought to be a logical definition of business data. Stereotyping the Data Object as a Resource defines it as one physical representation. The Data Object would need to be duplicated for another physical representation of the same logical contents.

It is very common for a program to receive from another program a data structure of a given type and to manipulate a Resource of the same type (for example, receive the current customer data and have access to the customer table).

Therefore, we decide to explicitly create a resource stereotyped Class and link it to a given DataObject. In order to clearly define the nature of the relationship, we introduce a dedicated "ResourceIsStructured" stereotype that is applied to the relationship, in order to indicate that the Resource is based on the logical data definition that the Data Object class represents.

One of the benefits of the solution proposed here is to solve the aforementioned problem and preserve the Data Object as the logical definition of a data structure. To identify a Resource, we will introduce a new class that references the DataObjects. This new class will represent the Resource, and will thus carry the "Resource" stereotype. We will also change the type of the parameters in the program from the DataObject to the Resource. That way, the Resource class reuses the logical definition of the DataObject and provides its additional physical characteristics. Several Resources can be based on the same DataObject, with their own different physical characteristics (VSAM file, Relational table in a database, etc.).

We ultimately obtain a program with a list of parameters. Each parameter can either be typed against a Resource that references a Data Object, against a Data Object directly or against a UML primitive type. In the first case, we have defined for the program a well identified Resource with its physical characteristics. In the second or third case, we define external data.

Step 205 is the input of the process. It is a UML Class diagram that represent a system at a logical level.

In step 210, an architect identifies amongst the classes of the UML class diagram, the ones that contain operations that represent a program. The architect applies to these operations the stereotype "Program". This step may be performed in a UML 2.0 compliant visual editor. The architect also applies the DataObject stereotype to the classes used as parameters of the operation.

Step 215 is the output of step 210. The UML class diagram contains now well identified Program Data Objects. These classes and operations are identified in the diagram through the use of the "Program" and "Resource" stereotypes.

Figure 3:
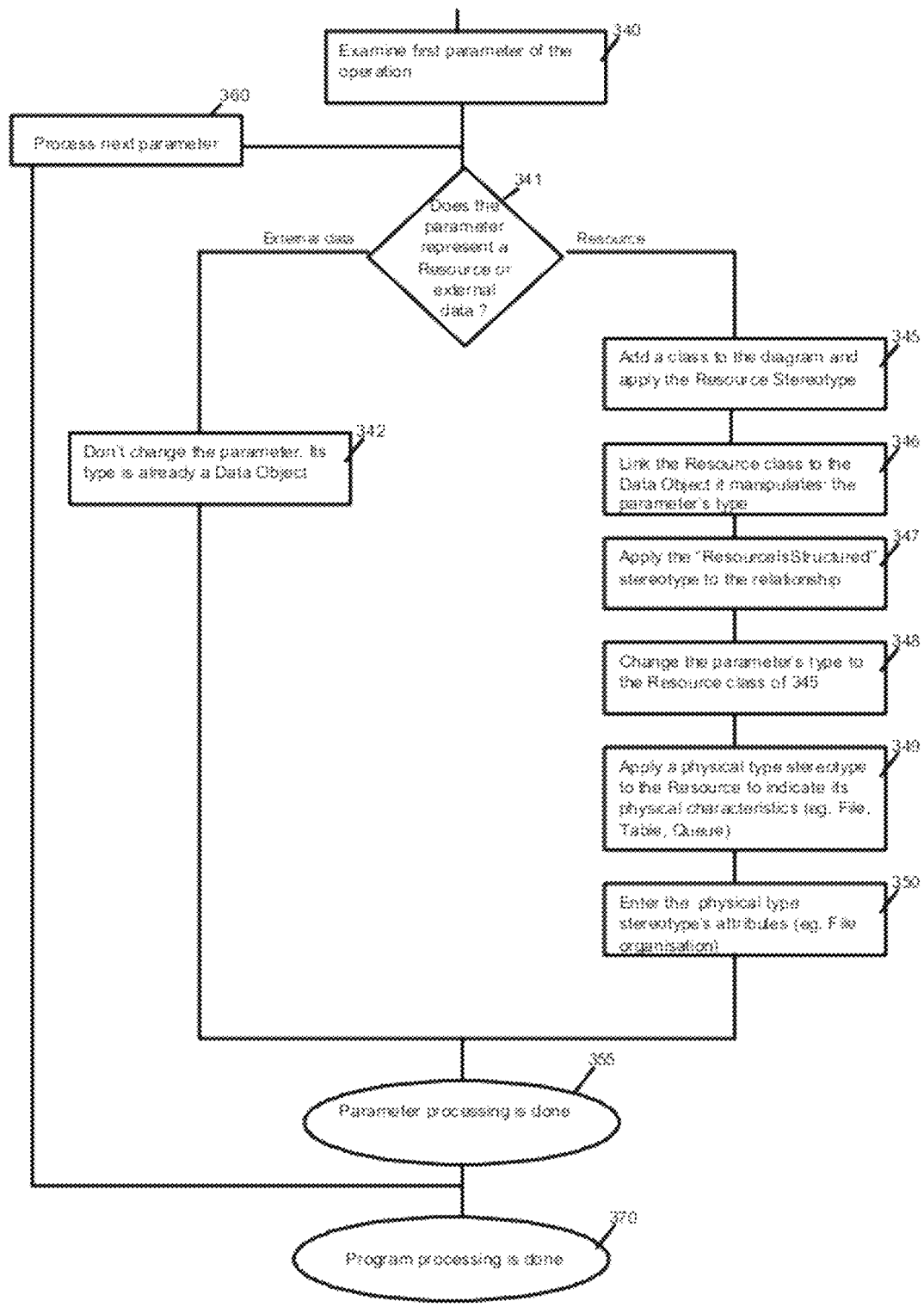
FIG. 3 shows the detailed flowchart of the 230 general step of FIG. 2 of the method of preferred embodiment.

Step 230 is further detailed in reference to FIG. 3. This step consists of processing the parameters of the program, introducing the Resource class, linking it to the DataObject and substituting the parameter type in order to use the Resource class instead of the DataObject class. This step is usually performed by an architect in a UML 2.0 compliant visual editor or can be performed with the help of the computer executing IBM Rational Software Architect (RSA) version 6 and 7 patterns as it will be detailed later in the document in reference to FIG. 5.

Step 235 is the output of step 230. It is a UML class diagram that defines Programs (stereotyped operations of a Service specification class) which have several parameters. These parameters can be of 3 types: a class stereotyped as Resource, a class stereotyped as DataObject or a UML primitive type. The classes stereotyped as Resources can also be further stereotyped to indicate the physical resource type involved (File, Table, etc.) and their characteristics. The Resource references a DataObject through a stereotyped relationship that explicitly states that this DataObject defines the contents of the Resource.

We have now obtained a simple description in a UML class diagram of a Resource oriented program. This description captures the resource definition of the program and their logical data structures. The Resources are themselves identified classes. It also capture the external data that a program receives from another program.

This diagram (235) is thus fully consistent with the initial UML class diagram (205); it is an extension of the initial diagram. The logical data definition captured by the Data Object classes are preserved. This UML model extension can be used for reviewing and validating the design of the program and clearly identify the Resources involved in a program and their types. It can be transformed into COBOL code for a given target (CICS, IMS, batch, etc.) that will contain the definition of the program, its resources and the data structures involved. It can then be enhanced by programmers to capture the business logic.

FIG. 3 is the detailed flowchart of step 230 of FIG. 2 according to the preferred embodiment. The input of these steps is a UML model that contains a class diagram, some operations in some classes (having been stereotyped as service 210) having been identified and stereotyped as programs (220). The classes that correspond to the types of the parameters of the operation have been identified and stereotyped as Data Object (step 210 of FIG. 2).

The architect is going to iterate over the parameters of the operation that represents each program in order to see if the parameter represents a Resource or some linkage data. He will process accordingly the parameter to reflect its status.

In step 340, the architect examines a parameter of the program. He will consider whether the parameter represents a resource of the program (such as a file) or not (step 341). If it does (answer "resource" to test 341), then he will take several steps to introduce a Resource class, link it to the DataObject class and change the type of the parameter to the newly introduced Resource class. He will first create a new class and apply the "Resource" stereotype to it (step 345). Next he will create a relationship between this new Resource class and the DataObject, which is the type of the parameter (step 346). He will stereotype this relationship to indicate that the Resource is based on the data definition expressed by the DataObject (step 347). Next he will change the type of the parameter so that it points to the Resource rather than to the DataObject (step 348). The architect can now further stereotype the Resource with a Physical type stereotype in order to indicate its physical type (File, Table, Message queue, etc.) (step 349). He will now enter the specific properties captured by the stereotype's attributes (step 350).

If the parameter represents an external data (answer "external data" to test 341) then, the parameter is supposed to represent in-memory data passed by a calling program. Its type can either be a Data Object, which will describe the logical composition of the data structure, or a UML primitive type for elementary fields. No further action is needed on this parameter (step 342).

Now that one parameter is processed (step 355), the architect can iterate and process the subsequent parameter (step 360). The architect will thus iterate and process all the parameters. With step 370, all the parameters have been processed and the program is now fully updated, the appropriate resource classes created and used, stereotypes applied where necessary and the appropriate properties are set.

Figure 4:
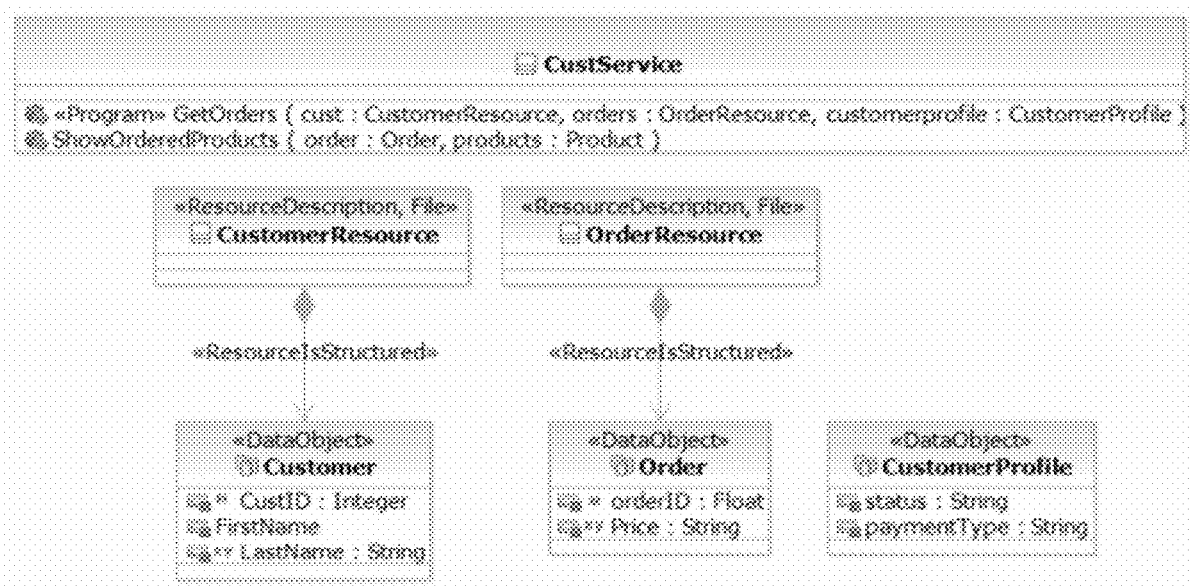
FIG. 4 illustrates an example of an class diagram that captures a program and its resources obtained according the method of the preferred embodiment.

FIG. 4 is an example of a class diagram (235) as obtained after execution of step 230. We have here an output of step 235 class diagram that describes a program obtained according the method of the referred embodiment. This is the class diagram obtained after execution of step 230. This class diagram describes a class CustService that contains two operations: GetOrders and ShowOrderedProducts. GetOrders has been identified as a program and thus has the stereotype "Program" applied to it. GetOrders has 3 parameters: cust of type CustomerResource, orders of type OrderResource and customerProfile of type CustomerProfile. CustomerResource and OrderResource are 2 classes on which the stereotype "Resource" has been applied. We consider them as being resources. Each of them are connected to, respectively, Customer and Order, through a stereotyped relationship. Customer, Order and CustomerProfile are classes on which the DataObject stereotype has been applied.

The second stereotype, the Physical type stereotype, is applied to CustomerResource and OrderResource: The "File" stereotype.

This diagram illustrates that the getOrders program manipulates two files, which dataStructure is defined in the two related DataObjects (Customer and Order). It also defines external data which structure is defined by the CustomerProfile DataObject.

We see that this diagram complies with the way that the input model has been built: it preserves the operations as a way to represent programs and Data object as a way to define logical data structures. It introduces new classes that don't duplicate any of the information but enrich the semantics of the Data Object with a dedicated relationship to it.

It is also possible to use the diagram as an input of a transformation to create the COBOL definition of the data structures, of the resources and of the programs described in this diagram. Said transformation will be used for automatic generation of the code (for instance COBOL code).

The class diagram can be processed using a UML V2 editor such as IBM Rational Software Architect version 6 or 7. Tools, such as IBM Rational Software Architect in version 6 and 7 propose the concept of patterns that allows automating the creation or update of models. Patterns are instantiated by the architect with a set of input parameters. The tool performs some processing based on these inputs that can, for example, create new classes, apply stereotypes, create relationships, etc.

Figure 5:
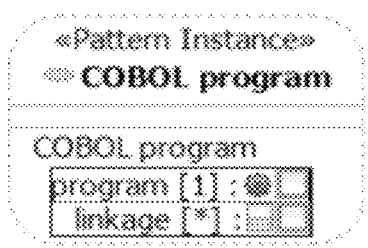
FIG. 5 illustrates patterns which can be used for automating some steps of the method of the preferred embodiment.

FIG. 5 describes a pattern which can be used for automating some steps of the method of the preferred embodiment. Such UML 2.0 editors as IBM Rational Software Architect in version 6 and 7 can be used to automate steps 230 for creating the resources out of the program parameters and modifying the type of the parameters to use the newly created Resources.

This pattern has 2 parameters:

"program" is mandatory and unique. It is the operation that represents a program and which parameters we want to process according to step 230

"linkage" is optional. It is a DataObject class to use as additional external data in the program. Several Data Objects can be specified and thus several new parameters for the operation will be created.

This pattern is provided as input to the IBM Rational Software Architect program product which, when executed, creates an extension of the initial UML model comprising Resources connected to the appropriate DataObjects and modifying the initial parameter types to point to the appropriate Resource instead of pointing to the Data Object.

Figure 6:
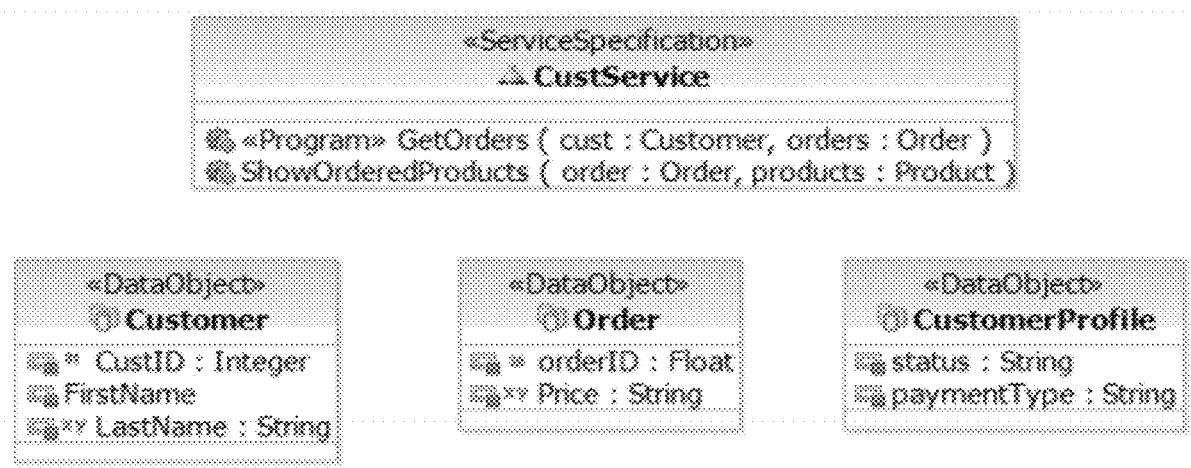
FIG. 6 is an example of the input of the pattern described in FIG. 5.

FIG. 6 shows an example of the input of step 230, which can be automated by the pattern. A program "GetOrders" has been identified and thus stereotyped in the class CustService. This program has 2 parameters: a parameter of type Customer, a parameter of type Order. These types are 2 classes of the class diagram that have been stereotyped as Data Objects. A third DataObject "CustomerProfile" has been identified.

Figure 7:
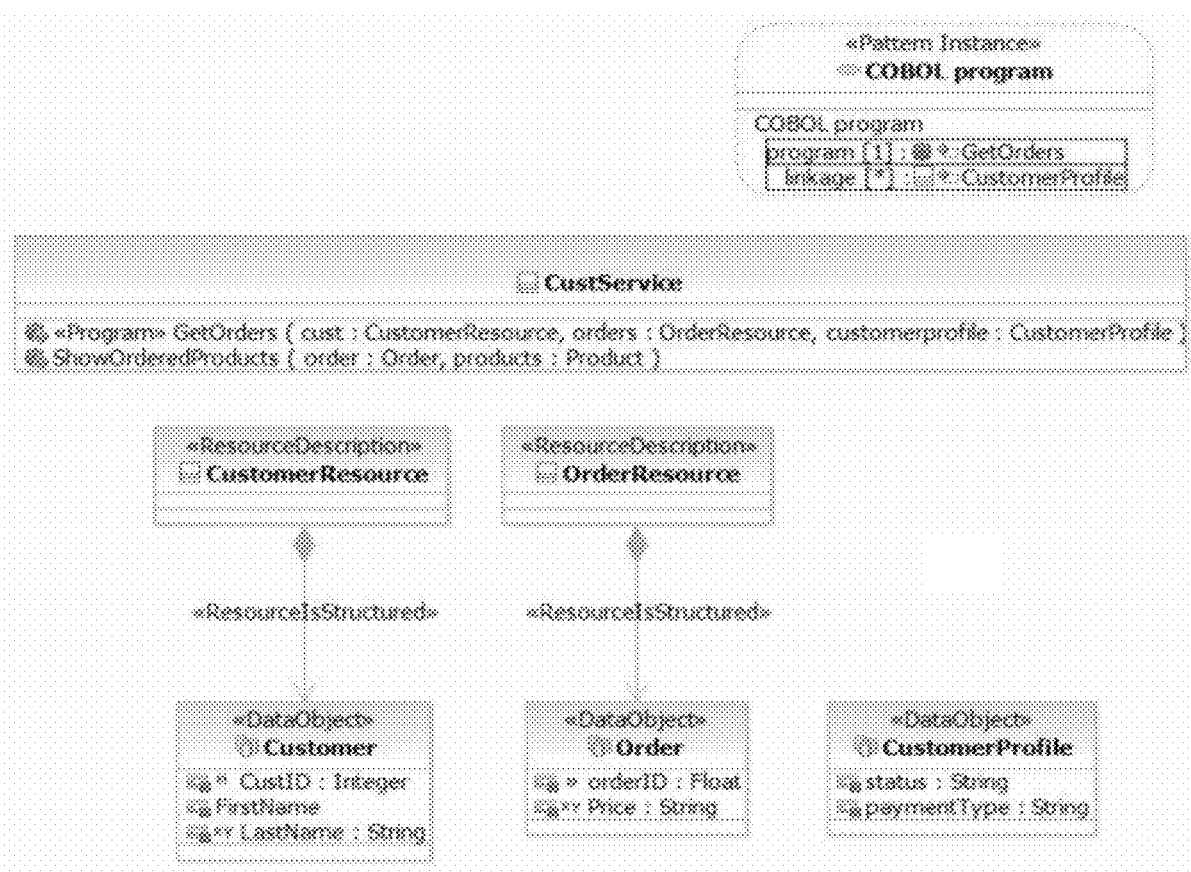
FIG. 7 is the output of the pattern of FIG. 5 applied to the classes described in FIG. 6.

FIG. 7 shows the application of the pattern described in FIG. 5 to the example of FIG. 6. The pattern is applied on Program "GetOrders". The DataObject "CustomerProfile" is specified to be added as external data to the program.

The result of the application of the pattern is as follows:
2 new classes CustomerResource and OrderResource stereotyped as "Resource". These classes are connected to the respective DataObjects "Customer" and "Order". The relationship between the Resource and DataObject is stereotyped as "ResourceIsStructured" to identify that the Resource logical structure definition is held by the DataObject.

The parameters of the operation "GetOrders" have changed. The type of the first 2 parameters has changed respectively from Customer to CustomerResource and from Order to OrderResource.

A third parameter, customerProfile, has been added to the parameters of the "GetOrders" operation. Its type is a DataObject thus it represents external data.

The invention claimed is:

1. A computer-implemented method of representing a software application to be coded in a procedural language, comprising
receiving, as a first computer data structure and within a visual editor, an initial UML class diagram modelizing the software application;
identifying, using the visual editor, data definition classes within the initial UML class diagram;
identifying, using the visual editor class operations within the initial UML class diagram;
modifying, the visual editor, the initial UML class diagram to generate an extended UML class diagram as a second computer data structure by
applying a data object stereotype to the identified data definition classes, and
applying a program stereotype to the identified class operations;
displaying, within the visual editor, the extended UML class diagram; and
using the extended UML class diagram to create program code in the procedural language;
for each parameter of the identified class operations, identifying whether the parameter is a resource or external data; and
upon identifying the parameter as external data, taking no further action and proceeding to process a next parameter, wherein
the data definition classes represent logical data, and
the class operations represents programs.

2. The method of claim 1, wherein
the procedural language is COBOL.

3. A computer-hardware system for representing a software application to be coded in a procedural language, comprising
a processor having a visual editor executing therein, wherein the processor is configured to perform:
receiving, as a first computer data structure and within the visual editor, an initial UML class diagram modelizing the software application;
identifying, using the visual editor, data definition classes within the initial UML class diagram;
identifying, using the visual editor class operations within the initial UML class diagram;
modifying, the visual editor, the initial UML class diagram to generate an extended UML class diagram as a second computer data structure by
applying a data object stereotype to the identified data definition classes, and
applying a program stereotype to the identified class operations;
displaying, within the visual editor, the extended UML class diagram; and
using the extended UML class diagram to create program code in the procedural language;
for each parameter of the identified class operations, identifying whether the parameter is a resource or external data; and
upon identifying the parameter as external data, taking no further action and proceeding to process a next parameter, wherein
the data definition classes represent logical data, and
the class operations represents programs.

4. The computer-hardware system of claim 3, wherein
the procedural language is COBOL.

5. A computer-implemented method of generating program code for a software application in a procedural language, comprising
displaying, as a first computer data structure and within a visual editor, an initial UML class diagram modelizing the software application;
generating an extended UML class diagram, as a second computer data structure, by modifying the initial UML class diagram, the modifying including:
applying, using the visual editor, a data object stereotype to identified data definition classes within the initial UML class diagram, and
applying, using the visual editor, a program stereotype to the identified class operations within the initial UML class diagram;
displaying, within the visual editor, the extended UML class diagram; and
generating the program code in the procedural language using the extended UML class diagram, wherein
the identified data definition classes represent logical data, and
the identified class operations represent programs.

6. The method of claim 5, further comprising:
receiving, for each parameter of the identified class operations as input within the visual editor, an identification whether the parameter is a resource or external data.

7. The method of claim 6, further comprising:
not modifying the parameter, upon the parameter being identified as the external data, and
processing a next parameter of the identified class operations.

8. The method of claim 6, further comprising:
upon the parameter being identified as the resource, creating a new class for the extended UML class diagram.

9. The method of claim 5, wherein
the procedural language is COBOL.

* * * * *